US011884074B2

(12) United States Patent
Kanzaki et al.

(10) Patent No.: US 11,884,074 B2
(45) Date of Patent: Jan. 30, 2024

(54) LIQUID DISCHARGING HEAD, METHOD OF PRODUCING THE SAME AND PRINTING APPARATUS

(71) Applicant: BROTHER KOGYO KABUSHIKI KAISHA, Nagoya (JP)

(72) Inventors: Shotaro Kanzaki, Handa (JP); Rimiko Ide, Obu (JP); Noriaki Tarumi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 70 days.

(21) Appl. No.: 17/747,362

(22) Filed: May 18, 2022

(65) Prior Publication Data

US 2022/0379605 A1 Dec. 1, 2022

(30) Foreign Application Priority Data

May 27, 2021 (JP) ................................ 2021-089496

(51) Int. Cl.
*B41J 2/16* (2006.01)
*B41J 2/14* (2006.01)
*B41J 2/045* (2006.01)

(52) U.S. Cl.
CPC ........... *B41J 2/1623* (2013.01); *B41J 2/0451* (2013.01); *B41J 2/1433* (2013.01); *B41J 2/14201* (2013.01); *B41J 2/1607* (2013.01); *B41J 2002/14411* (2013.01)

(58) Field of Classification Search
CPC .... B41J 2/1623; B41J 2/0451; B41J 2/14201; B41J 2/1433; B41J 2/1607; B41J 2002/14411; B41J 2/161; B41J 2/1626; B41J 2002/14419; B41J 2002/14459; B41J 2202/20; B41J 2/14233; B41J 2202/12
See application file for complete search history.

(56) References Cited

U.S. PATENT DOCUMENTS

2020/0376839 A1 12/2020 Hirai et al.

FOREIGN PATENT DOCUMENTS

| | | | |
|---|---|---|---|
| JP | 2004-291479 A | | 10/2004 |
| JP | 2004291479 A | * | 10/2004 |
| JP | 2020-196202 A | | 12/2020 |

OTHER PUBLICATIONS

Hayashi, Tatsuya et al., "Inkjet Head and Manufacturing Method for the Same" (JP 2004291479 A), Oct. 21, 2004, [Paragraphs 0030-0035, Figs. 1-7]. (Year: 2004).*

* cited by examiner

*Primary Examiner* — Lisa Solomon
(74) *Attorney, Agent, or Firm* — Merchant & Gould P.C.

(57) ABSTRACT

There is provided liquid discharging head including; channel member which includes plates stacked in a first direction and adhered to each other via adhesive, and in which individual channels each including nozzle and pressure chamber communicated with the nozzle is formed. The plates include first plate and second plate adhered to adhesion surface of the first plate via the adhesive. Hollows each construct one of the individual channels are opened in the adhesion surface. The hollows are arranged side by side in second direction orthogonal to the first direction in the adhesion surface, and three or more grooves are formed in the adhesion surface between two of the hollows adjacent to each other in the second direction, each of the three or more grooves extending in third direction which is orthogonal to the first direction and which crosses the second direction.

14 Claims, 5 Drawing Sheets

LIQUID DISCHARGING HEAD, METHOD OF PRODUCING THE SAME AND PRINTING APPARATUS

CROSS REFERENCE TO RELATED APPLICATION

The present application claims priority from Japanese Patent Application No. 2021-089496, filed on May 27, 2021, the disclosure of which is incorporated herein by reference in its entirety.

BACKGROUND

The present disclosure relates to a liquid discharging head provided with a channel member constructed of a plurality of plates which is adhered to each other via an adhesive, a method of producing the liquid discharging head, and a printing apparatus.

There is a known liquid discharging head having: a stacked body (channel member) in which a plurality of plates is stacked and facing surfaces of adjacent plates, of the plurality of plates, are adhered with an adhesive; and individual channel formed in the stacked body. A return throttle channel which constructs the individual channel and a release groove are formed in the lower surface of a first channel plate which is one of the plurality of plates. The lower surface is a surface to which a nozzle plate is adhered via the adhesive (adhesion surface). By allowing any excessive portion of the adhesive to flow to the release groove, any clogging or blocking of the individual channel are suppressed.

SUMMARY

A liquid discharging head according to the present disclosure includes a channel member which includes a plurality of plates stacked in a first direction and adhered to each other via an adhesive, and in which a plurality of individual channels each including a nozzle and a pressure chamber communicated with the nozzle is formed.

The plurality of plates includes a first plate and a second plate adhered to an adhesion surface of the first plate via the adhesive.

A plurality of hollows each constructs one of the plurality of individual channels is opened in the adhesion surface.

The plurality of hollows is arranged side by side in a second direction orthogonal to the first direction in the adhesion surface, and three or more grooves are formed in the adhesion surface between two of the plurality of hollows adjacent to each other in the second direction, each of the three or more grooves extending in a third direction which is orthogonal to the first direction and which crosses the second direction.

A method of producing a liquid discharging head according to the present disclosure includes following.

Forming, in each of a plurality of plates including a first plate and a second plate, a plurality of hollows which constructs a plurality of individual channels each including a nozzle and a pressure chamber communicated with the nozzle.

Forming a groove in an adhesion surface, of the first plate, to which the second plate is to be adhered via an adhesive, and in which the plurality of hollows is opened.

Forming a channel member in which the plurality of individual channels is formed by stacking the plurality of plates in the first direction and adhering the plurality of plates to each other via the adhesive, after the forming of the plurality of hollows and the forming of the groove.

In the adhesion surface, the plurality of hollows is arranged side by side in a second direction orthogonal to the first direction.

The groove formed in the forming of the groove is three or more grooves between two of the plurality of hollows adjacent to each other in the second direction, each of the three or more grooves extending in a third direction which is orthogonal to the first direction and which crosses the second direction.

DETAILED DESCRIPTIONS

In a liquid discharging head of Japanese Patent Application Laid-open No. 2020-196202, since only one release groove is provided between two return throttle channels (two hollow parts) constructing individual channels, an area to which the adhesive is adhered or applied is large in an adhesive region between the two hollow parts, and thus the amount of the applied adhesive might become to be greater than the sufficient or necessary amount. In such a case, any excess portion of the adhesive might flow out from the release groove, and that the individual channel(s) might be clogged.

An object of the present disclosure is to provide a liquid discharging head capable of suppressing any clogging of the individual channel(s) due to the adhesive, in a more ensured manner, and to provide a method of producing the liquid discharging head.

<Overall Configuration of Printer>

Figure 1:
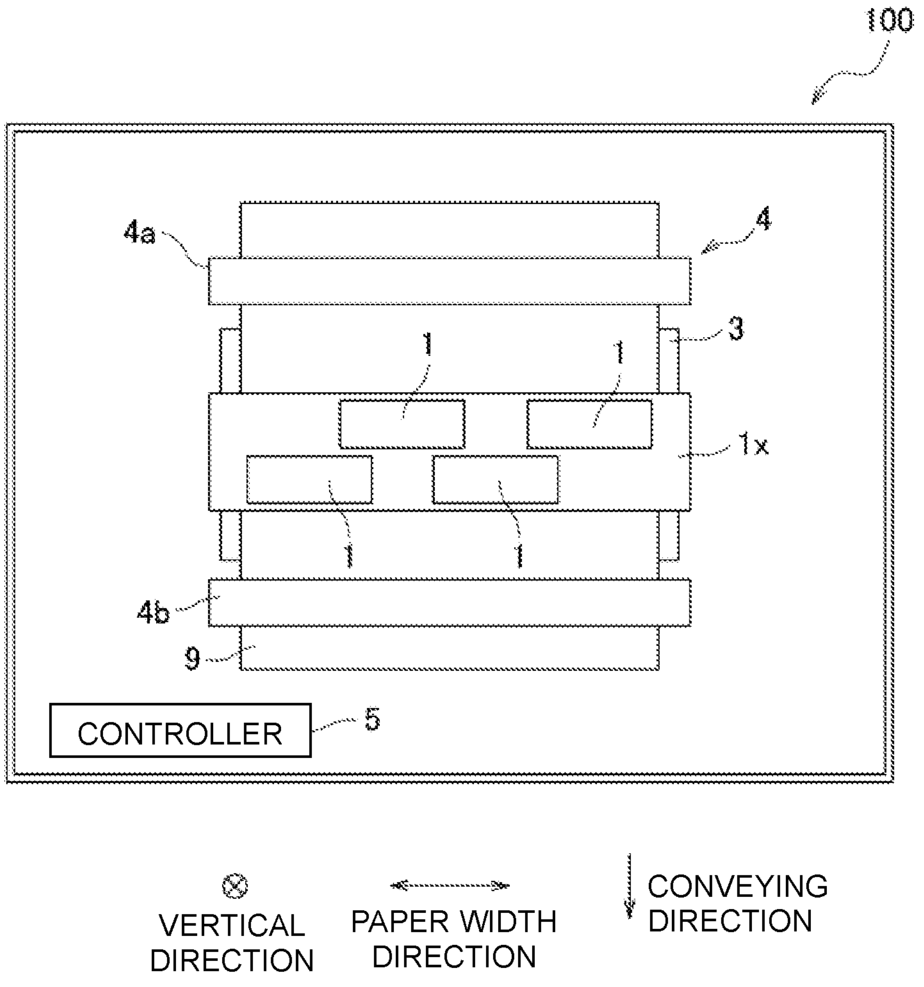
FIG. 1 is a plane view of a printer 100 provided with a head 1.

First, the overall configuration of a printer 100 provided with a head (liquid discharging head) 1 according to an embodiment of the present disclosure will be explained, with reference to FIG. 1.

The printer 100 is provided with a head unit 1*x* including four heads 1, a platen 3, a conveying mechanism 4 and a controller 5.

The head unit 1*x* is long in a paper width direction (a direction orthogonal to the vertical direction), and is of a line system in which an ink is discharged or ejected from a nozzle 21 (see FIGS. 2 and 3) toward a sheet 9 (paper sheet 9 or paper 9) in a state that a position of the head unit 1*x* is fixed. Each of the four heads 1 is long in the paper width direction, and the four heads 1 are arranged in a staggered manner in the paper width direction.

The platen 3 is a flat plate-like member which is arranged at a location below the head unit 1*x*, and which extends in a direction orthogonal to the vertical direction. The sheet 9 is supported on the upper surface of the platen 3.

The conveying mechanism 4 has two roller pairs 4*a* and 4*b* which are disposed to interpose the platen 3 in a conveying direction (a direction orthogonal to the vertical direction and the paper width direction). In a case that a conveying motor (not depicted in the drawings) is driven by control of the controller 5, the roller pairs 4$a$ and 4$b$ rotate while nipping the sheet 9, thereby conveying the sheet 9 in the conveying direction.

The controller 5 includes a ROM (Read Only Memory), a RAM (Random Access Memory) and an ASIC (Application Specific Integrated Circuit). The ASIC executes a recording process, etc., in accordance with a program stored in the ROM. In the recording process, the controller 5 controls the conveyance motor and a driver IC of each of the heads 1 (both of the conveyance motor and the driver IC are not depicted in the drawings) based on a recording instruction (including image data) inputted from an external apparatus such as a personal computer, etc., thereby causing the conveying mechanism 4 to perform conveyance of the sheet 9 and causing each of the heads 1 to perform discharging of the ink toward the sheet 9 so as to record an image on the sheet 9.

<Configuration of Head>

Next, the configuration of each of the heads 1 will be explained, with reference to FIGS. 2 to 4.

Figure 3:
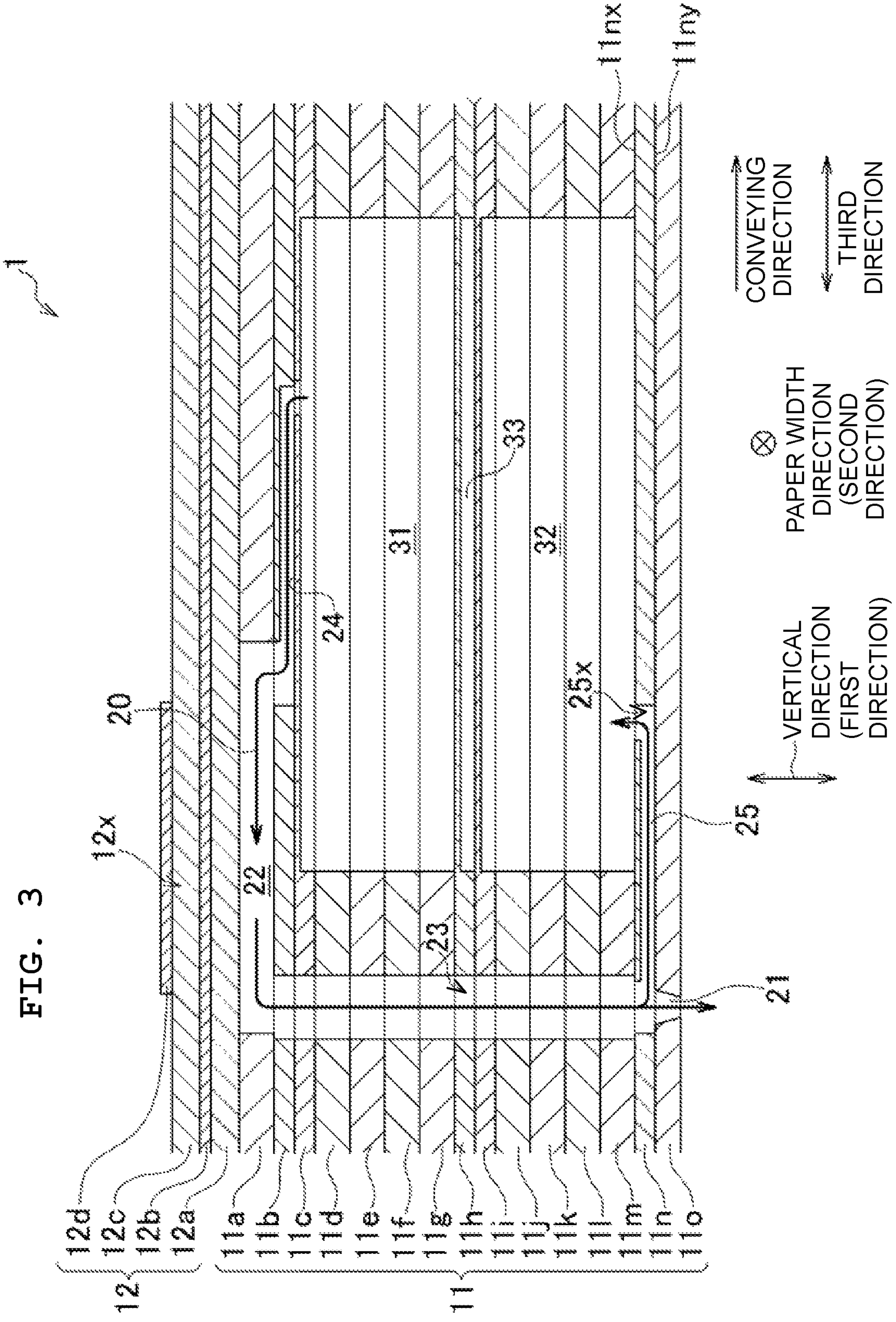
FIG. 3 is a cross-sectional view of the head 1, along a line in FIG. 2.

As depicted in FIG. 3, each of the heads 1 includes a channel member 11 and an actuator member 12.

<Configuration of Channel Member>

The channel member 11 is constructed of 15 pieces of plates which are plates 11$a$ to 11$o$ stacked in the vertical direction (first direction) and adhered to one another via an adhesive. Through holes and/or recessed parts (hollows, or hollow parts) constructing a channel are formed in the respective plates 11$a$ to 11$o$. The channel includes a plurality individual channels 20, a supply channel 31 and a return channel 32.

Figure 2:
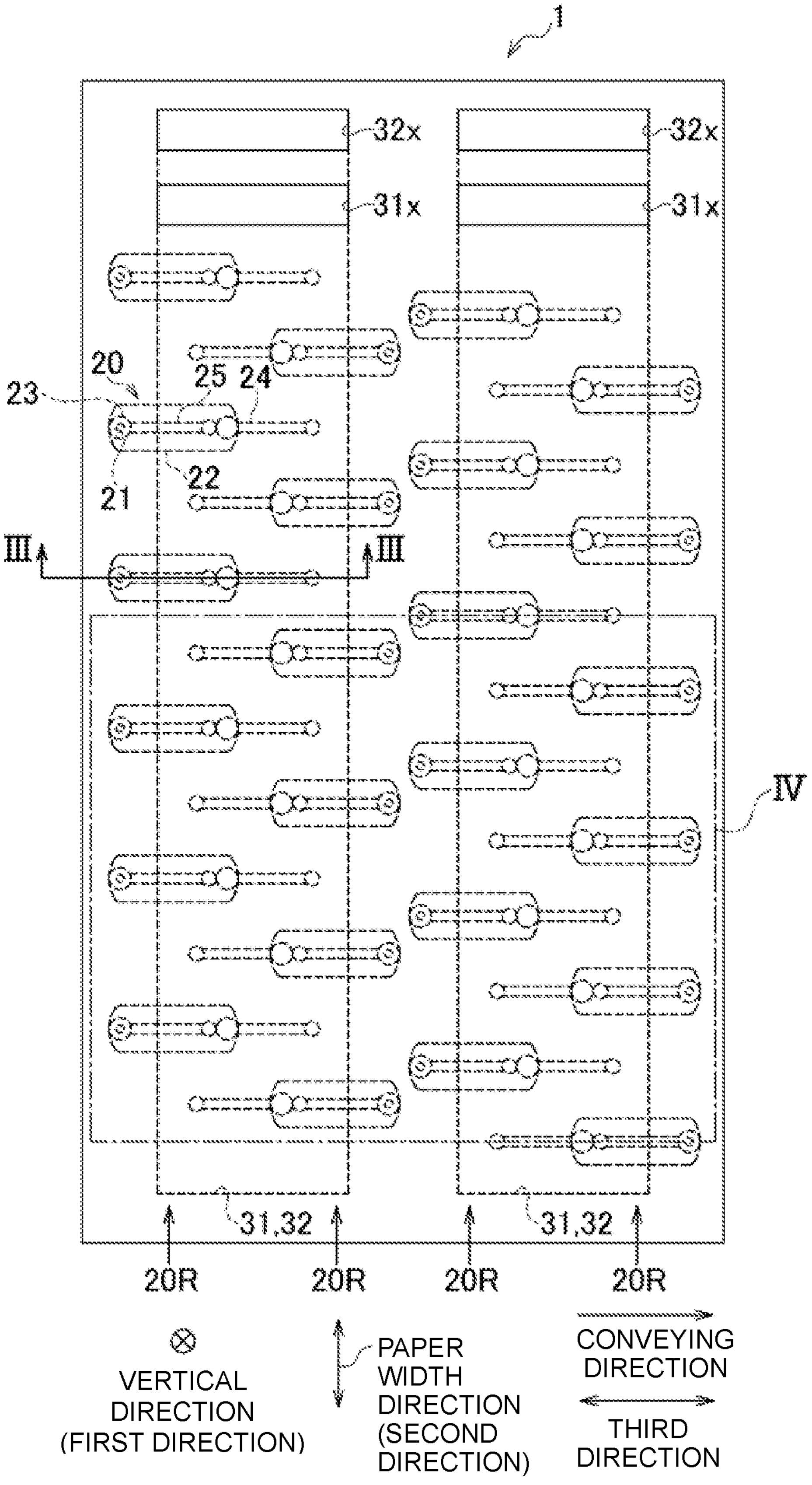
FIG. 2 is a plane view of the head 1.

As depicted in FIG. 2, the plurality of individual channels 20 are aligned in the paper width direction (second direction) and construct four individual channel rows 20R. The four individual channel rows 20R are arranged in a direction (third direction) which is along the conveying direction. In a plane orthogonal to the vertical direction, the plurality of individual channels 20 are arranged, as a whole, in the staggered (zigzag) manner.

With respect to two individual channel rows 20R, among the four individual channel rows 20R, a set of the supply channel 31 and the return channel 32 are provided. Individual channels 20 which belong to two individual channel rows 20R on the left side of FIG. 2 communicate with a left-side set of the supply channel 31 and the return channel 32 on the left side of FIG. 2. Individual channels 20 which belong to two individual channel rows 20R on the right side of FIG. 2 communicate with to a right-side set of the supply channel 31 and the return channel 32 on the right side of FIG. 2.

The supply channel 31 and the return channel 32 of each of the sets extend in the paper width direction, and are arranged side by side in the vertical direction, as depicted in FIG. 3. The supply channel 31 and the return channel 32 are communicated with an ink tank (not depicted in the drawings) via, respectively, a supply port 31$x$ and a return port 32$x$ each of which is provided on an one end thereof in the paper width direction (upper ends in FIG. 2). The supply channel 31 and the return channel 32 of each of the sets are connected or linked to each other at the other ends thereof in the paper width direction (lower ends in FIG. 2).

Here, a flow of the ink in the supply channel 31 and the return channel 32 of each of the sets will be explained. In a case that a pump (not depicted in the drawings) is driven by control of the controller 5, the ink inside the ink tank is supplied to the supply channel 31 via the supply port 31$x$. The ink inflowed into the supply channel 31 is supplied to the individual channels 20 of two individual channel rows 20R communicating with the supply channel 31, while moving in the inside of the supply channel 31 from one end thereof in the paper width direction (upper end in FIG. 2) toward the other end thereof in the paper width direction (lower end in FIG. 2). The ink which has reached the other end in the paper width direction (lower end in FIG. 2) of the supply channel 31, and the ink which has flowed out from each of the individual channels 20 flow into the return channel 32. The ink inflowed into the return channel 32 moves in the inside of the return channel 32 from the other end thereof in the paper width direction (lower end in FIG. 2) toward the one end thereof in the paper width direction (upper end in FIG. 2), and is returned to the ink tank via the return port 32$x$.

As depicted in FIG. 3, the supply channel 31 is constructed of a recessed part formed in the lower surface of the plate 11$c$ and through holes formed in the plates 11$d$ to 11$g$. The return channel 32 is constructed of a recessed part formed in the lower surface of the plate 11$i$ and through holes formed in the plates 11$j$ to 11$m$. A damper chamber 33 is provided between, in the vertical direction, the supply channel 31 and the return channel 32 of each of the sets. The damper chamber 33 is constructed of a recessed part formed in the lower surface of the plate 11$h$.

Each of the plurality of individual channels 20 includes a nozzle 21, a pressure chamber 22, a connecting channel 23 connecting the nozzle 21 and the pressure chamber 22, an inflow channel 24 communicating the pressure chamber 22 and the supply channel 31, and an outflow channel 25 communicating the connecting channel 23 and the return channel 32. The inflow channel 24, the pressure chamber 22, the connecting channel 23, the nozzle 21 and the outflow channel 25 are connected to one another to thereby form each of the plurality of individual channels 20, and each correspond to an example of a "channel" of the present invention.

The nozzle 21 is constructed of a through hole formed in the plate 11$o$, and is opened in the lower surface of the channel member 11.

The pressure chamber 22 is constructed of a through hole formed in the plate 11$a$, and is opened in the upper surface of the channel member 11.

The connecting channel 23 is a channel having a circular cylindrical shape extending downward from one end in the conveying direction of the pressure chamber 22, and is constructed of through holes formed in the plates 11$b$ to 11$n$. The nozzle 21 is arranged immediately below the connecting channel 23.

The inflow channel 24 has one end connected to a lower surface of the other end in the conveying direction of the pressure chamber 22 (an end part, of the pressure chamber 22, on the opposite side to the end part to which the connecting channel 23 is connected), and the other end connected to the upper surface of the supply channel 31.

The outflow channel 25 has one end connected to a side surface of a lower end of the connecting channel 23, and the other end 25$x$ connected to the lower surface (bottom part) of the return channel 32.

As depicted in FIG. 2, each of the inflow channel 24 and the outflow channel 25 extends in the conveying direction, has a width which is smaller than a width (length in the paper width direction) of the pressure chamber 22, and function as a throttle.

The ink supplied from the supply channel 31 to each of the plurality of individual channels 20 flows through the inflow channel 24 and flows into the pressure chamber 22, moves substantially horizontally in the inside of the pressure chamber 22, and flows into the connecting channel 23, as indicated by arrows in FIG. 3. The ink flows through the connecting channel 23 and moves downward, a part of the ink is discharged from the nozzle 21, and the remainder of the ink flows through the outflow channel 25 and flows into the return channel 32.

By circulating the ink between the ink tank and the channel member 11 in such a manner, it is possible to realize exhaust (discharge) of an air bubble and/or prevention of increase in the viscosity of the ink in the supply channel 31 and the return channel 32 formed in the channel member 11, and further in each of the plurality of individual channels 20.

<Characteristics of Present Disclosure>

The outflow channel 25 has the width which is narrower than a width of the connecting channel 23 which is a channel part connected to the outflow channel 25. The outflow channel 25 corresponds to an example of a "throttle channel" of the present invention.

As depicted in FIG. 3, the outflow channel 25 is constructed of a recessed part formed in a lower surface 11*ny* of the plate 11*n*, and a through hole (a through hole constructing the other end 25*x*) connected to an end part of the recessed part. For example, the thickness of the plate 11*n* is in a range of 50 μm to 60 μm, and the depth of the recessed part is in a range of 30 μm to 40 μm.

The plate 11*n* corresponds to an example of a "first plate" of the present invention, the plate 11*o* corresponds to an example of a "second plate" of the present invention, and the plate 11*o* is adhered, via an adhesive, to the lower surface 11*ny* (corresponding to an example of an "adhesion surface" of the present invention) of the plate 11*n*.

Figure 4:
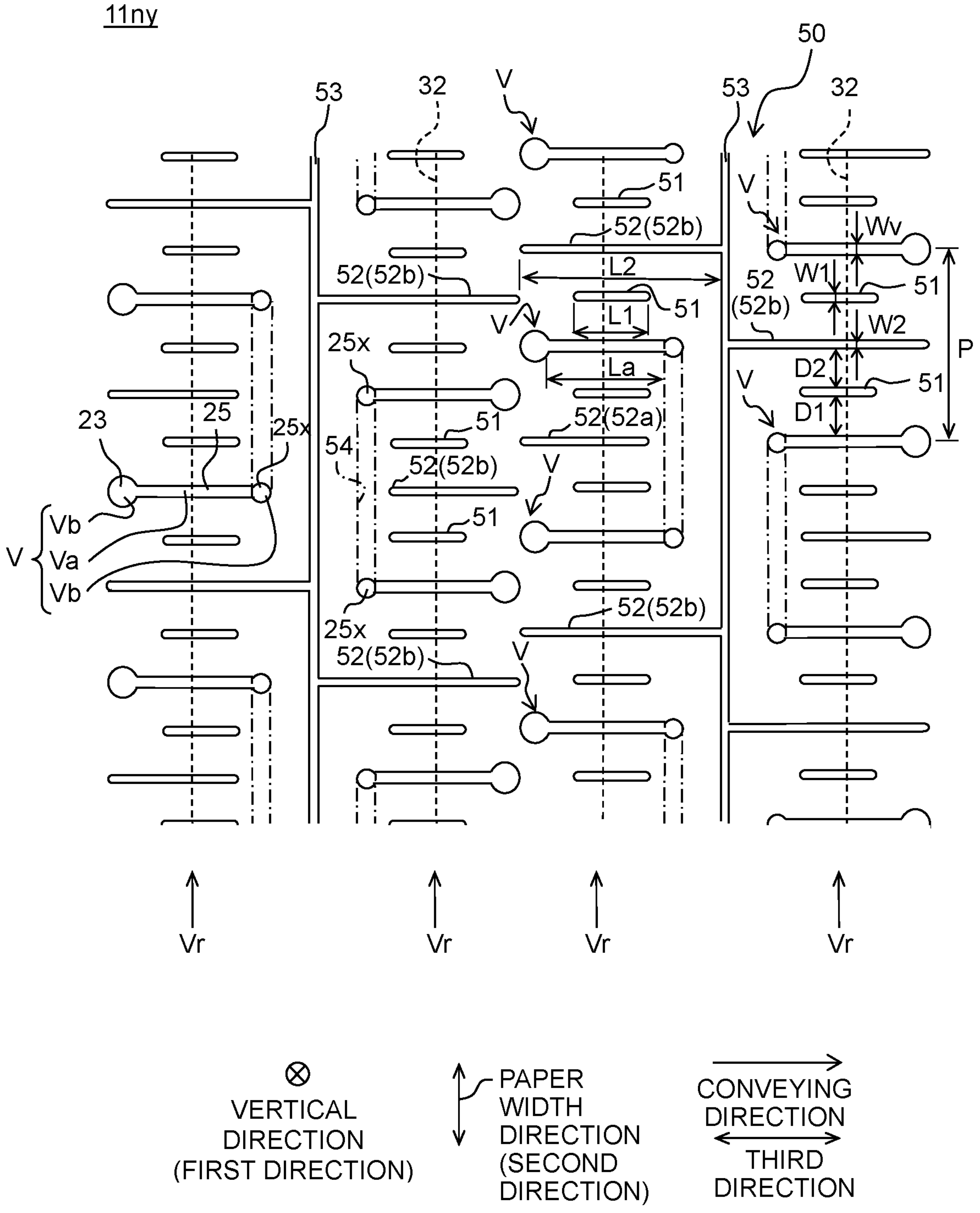
FIG. 4 is an enlarged view of an area IV, in FIG. 2, in a lower surface 11*ny* of a plate 11*n* constructing a channel member 11 of the head 1 depicted in FIG. 3.

The through hole constructing the connecting channel 23 of each of the plurality of individual channels 20, and the recessed part and the through hole constructing the outflow channel 25 of each of the plurality of individual channels 20 are opened in the lower surface 11*ny* of the plate 11*n*, as a hollow part V (see FIG. 4).

As depicted in FIG. 4, the hollow part V has a narrow width part (narrow part) Va which is an opening of the recessed part constructing the outflow channel 25, and two wide width parts (wide parts) Vb which are provided, respectively, on one end and the other end in the conveying direction of the narrow width part Va. A width (a length in the paper width direction: for example, in a range of 100 μm to 150 μm) of each of the wide width parts Vb is greater than a width of the narrow width part Va (for example, in a range of 70 μm to 90 μm). One of the two wide width parts Vb is an opening of the through hole constructing the connecting channel 23, and the other of the two wide width part Vb is an opening of the through hole constructing the other end 25*x* of the outflow channel 25.

A plurality of pieces of the hollow part V are aligned in the paper width direction in the lower surface 11*ny* of the plate 11*n*, and form four rows Vr arranged side by side in the conveying direction. Each of the four rows Vr corresponds to one of the four individual channel rows 20R (see FIG. 2). For example, in a case that the resolution is 50 dpi, hollow parts V belonging to each of the four rows Vr are aligned in the paper width direction at a pitch of approximately 508 μm.

Regarding each of the four rows Vr, the hollow parts V belonging to a certain row Vr do not overlap, in the paper width direction (namely, as seen in the paper width direction), with the hollow parts V belonging to another row Vr which is adjacent in the conveying direction to the certain row Vr, and are separated in the conveying direction from, the hollow parts V belonging to another row Vr which is adjacent in the conveying direction to the certain row Vr.

A groove 50 is formed in the lower surface 11*ny* and an upper surface 11*nx* of the plate 11. The groove 50 includes an adjacent groove 51, a central groove 52 and a linking groove 53 formed in the lower surface 11*ny*, and a connecting groove 54 formed in the upper surface 11*nx*. Note that the groove 50 is not a space defining the ink channel such as the individual channel 20, etc.

The adjacent groove 51 and the central groove 52 extend in the conveying direction. The linking groove 53 and the connecting groove 54 extend in the paper width direction. The widths of the grooves 51 to 53 are mutually same, and are smaller than the width of the narrow width part Va. For example, a width Wv of the narrow width part Va may be in a range of 70 μm to 90 μm, whereas a width W1 of the adjacent groove 51 and a width W2 of the central groove 52 are each in a range of 30 μm to 70 μm. The connecting groove 54 has a width greater than the widths of the grooves 51 to 53.

Three grooves 51 and 52 are formed between two pieces of the hollow part V (two hollows, or two hollow parts V) which are adjacent to each other in the paper width direction. Each of the three grooves 51 and 52 is overlapped with two hollow parts V in the paper width direction. The three grooves 51 and 52 are constructed of two adjacent grooves 51 each of which is adjacent to the hollow part V in the paper width direction, and one central groove 52 positioned between the two adjacent grooves 51 in the paper width direction. A spacing distance D1 between the hollow part V and the adjacent groove 51 which are adjacent to each other in the paper width direction and a spacing distance D2 between the adjacent groove 51 and the central groove 52 which are adjacent to each other in the paper width direction are each not less than 50 μm.

A length L1 in the conveying direction of the adjacent groove 51 is not more than a length La in the conveying direction of the narrow width part Va. The adjacent groove 51 overlaps with the narrow width Va in the paper width direction (namely, as seen in the paper width direction), and does not overlap with the wide width part Vb in the paper width direction (namely, as seen in the paper width direction).

A length L2 in the conveying direction of the central groove 52 is longer than the length La in the conveying direction of the narrow width part Va. Here, the length L2 means the length of a long length central groove 52*b* described below. Note that a length of a short length central groove 52*a* described below is longer than the length La in the conveying direction of the narrow width part Va as well.

For example, the length L1=500 μm to 550 μm, the length La=560 μm to 600 μm and the length L2=700 μm to 750 μm.

The central groove 52 includes a short length central groove 52*a* of which length in the conveying direction is relatively short, and a long length central groove 52*b* of which length in the conveying direction is longer than the length of the short length central groove 52*a* in the conveying direction. The short length central groove 52*a* overlap in the paper width direction (namely, as seen in the paper width direction) with the narrow width part Va and one of the two wide width parts Vb (a part corresponding to the connecting channel 23), and does not overlap in the paper width direction (namely, as seen in the paper width direction) with the other of the two wide width parts Vb (a part corresponding to the other end 25*x* of the outflow channel 25). The long length central groove 52*b* overlaps in the paper width direction (namely, as seen in the paper width direction) with the narrow width part Va and the two wide width parts Vb. In each of the four rows Vr, the short length central groove 52*a* and the long length central groove 52*b* are alternately arranged.

The linking groove 53 is arranged each between two rows Vr, among the four rows Vr, which are adjacent to each other in the conveying direction, and links a plurality of pieces of the long length central groove 52*b* belonging to the two rows Vr.

The linking groove 53 communicates with an atmosphere communicating groove (not depicted in the drawings) formed in the plate 11*a*, and the linking groove 53 communicates with the atmosphere. The long length central groove 52*b* connected to the linking groove 53 communicates with the atmosphere via the linking groove 53. On the other hand, the short length central groove 52*a* and the adjacent groove 51 are each a closed space (namely, a space which does not communicate with the upper surface 11*nx* of the plate 11*n*), and do not communicate with the atmosphere.

The connecting groove 54 formed in the upper surface 11*nx* of the plate 11 connects or links two wide width parts Vb (the parts each of which corresponds to the other end 25*x* of the outflow channel 25) of two pieces of the hollow part V which are adjacent to each other in the paper width direction, in an area between two pieces of the long length central groove 52*b* which are adjacent to each other in the paper width direction. The other end 25*x* is connected to a bottom part of the return channel 32 which corresponds to an example of a "common channel" of the present invention (see FIG. 3). The connecting groove 54 overlaps with three grooves (the two adjacent grooves 51 and the one short length central groove 52*a*) in the conveying direction (namely, as seen in the conveying direction), but does not overlap with the three grooves (the two adjacent grooves 51 and the one short length central groove 52*a*), in the vertical direction (namely, as seen in the vertical direction).

<Configuration of Actuator Member>

As depicted in FIG. 3, the actuator member 12 is fixed to the upper surface of the channel member 11 (the upper surface of the plate 11*a*), and includes a vibration plate 12*a*, a common electrode 12*b*, a piezoelectric body 12*c* and a plurality of individual channels 12*d*, in this order from the lower side.

The vibration plate 12*a*, the common electrode 12*b* and the piezoelectric body 12*c* cover all the pressure chambers 22 formed in the plate 11*a*. On the other hand, each of the plurality of individual electrodes 12*d* is provide with respect to one of the pressure chambers 22, and overlaps with one of the pressure chambers 22 in the vertical direction.

The common electrode 12*b* and the plurality of individual electrodes 12*d* are electrically connected to a driver IC (not depicted in the drawings). The driver IC maintains the potential of the common electrode 12*b* at the ground potential, whereas the driver IC changes the potential of each of the plurality of individual electrodes 12. Specifically, the driver IC generates a driving signal based on a control signal from the controller 5, and provides the driving signal to the electrode 12*d*. With this, the electric potential of the individual electrode 12*d* is changed between a predetermined driving potential and the ground potential. In this situation, a part, of the vibration plate 12*a* and a part, of the piezoelectric body 12*c*, (actuator 12*x*) which are interposed between the individual electrode 12*d* and the pressure chamber 22 are deformed to project toward the pressure chamber 22, thereby changing the volume of the pressure chamber 22 and applying pressure to the ink inside the pressure chamber 22 and causing the ink to be discharged or ejected from the nozzle 21. The actuator member 12 has a plurality of actuators 12*x* each of which corresponds to one of the pressure chambers 22.

<Method of Producing Head>

Figure 5:
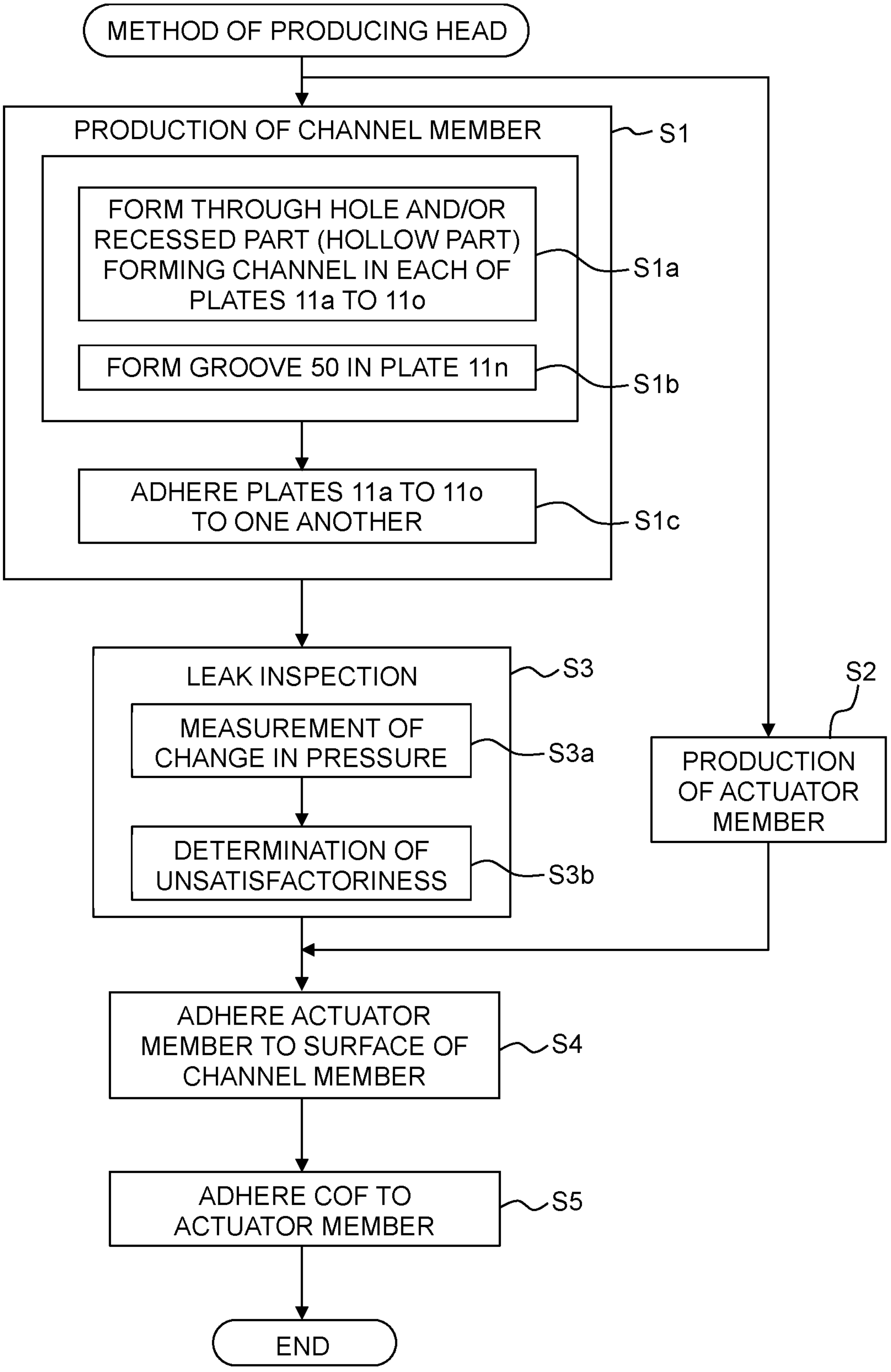
FIG. 5 is a flow chart indicating a method of producing the head 1.

Next, a method of producing the head 1 will be explained, with reference to FIG. 5.

First, a producing processing of the channel member 11 (step S1) and a producing processing of the actuator member 12 (step S2) are performed in parallel.

In the producing processing of the channel member 11 (step S1), first, through hole(s) and/or recessed part(s) (hollow part(s)) constructing channel(s) is/are formed in each of the plates 11*a* to 11*o* constructing the channel member 11 (step S1*a*: channel forming step).

Here, with respect to the plate 11*n* (corresponding to an example of the "first plate" of the present invention), the groove 50 (see FIG. 4) is formed (step S1*b*: groove forming step), concurrently with the forming of the through holes and/or the recessed parts (hollows, or hollow parts) constructing the individual channels (step S1*a*). Specifically, the adjacent grooves 51, the central grooves 52 and the linking grooves 53 are formed in the lower surface 11*ny* (corresponding to an example of the "adhesion surface" of the present invention) of the plate 11*n*, and the connecting grooves 54 are formed in the upper surface 11*nx* of the plate 11*n*.

The recessed part in step S1*a* and the groove 50 in step S1*b* are formed by etching, etc. For example, the recessed part forming the outflow channel 25, and the grooves 51 to 53 are formed at a time by etching using one photomask with respect to the lower surface 11*ny* of the plate 11*n* (steps S1*a*, S1*b*).

After steps S1*a* and S1*b*, the plates 11*a* to 11*o* are stacked, with the adhesive intervened therebetween, and are adhered to one another (step S1*c*; adhering step). With this, the channel member 11 is completed.

Note that in the present embodiment, a leak inspection is performed with respect to the completed channel member 11 (step S3), after step S1.

In step S3, first, air is poured for example from the supply ports 31*x* and the return ports 32*x* so as to apply pressure to the individual channels 20 in a state that the long length central grooves 52*b* (see FIG. 4) are communicated with the atmosphere via the linking groove 53 and in a state that the nozzles 21 and the pressure chambers 22 which are opened in the surface of the channel member 11 are sealed with a sealing member. Then, a pressure sensor, etc., is used so as to measure any change in the pressure in the individual channels 20 (step S3*a*: measuring step).

After step S3*a*, it is determined as to whether the channel member 11 is satisfactory or unsatisfactory based on the change in the pressure measured in step S3*a* (step S3*b*; determination step). For example, in a case that the pressure is lowered, in the channel member 11, by an amount not less than a predetermined amount in a predetermined period of time, the channel member 11 is determined to be an unsatisfactory product in which a leak might occur. In a case that the channel member 11 is determined to be unsatisfactory, the processing of step S1 is executed again so as to produce a channel member 11. A channel member 11 which passes the leak inspection (step S3) (namely, which is not determined to be unsatisfactory) is used in processing of step S4 and thereafter.

In the production of the actuator member 12 (step S2), the common electrode 12*b* is formed on a surface of the vibration plate 12*a* by a screen printing, then the piezoelectric body 12*c* is formed on a surface of the common electrode 12*b*, and the plurality of individual electrodes 12*d* are formed on a surface of the piezoelectric body 12*c*.

After steps S2 and S3, the actuator member 12 produced in step S2 is adhered to a surface of the channel member 11 which has passed the leak inspection in step S3 (step S4).

After step S4, a wiring substrate such as a COF (Chip on Film), etc., is/are adhered to the actuator member 12 (step S5), thereby completing the head 1.

As described above, according to the present embodiment, the three grooves 51 and 52 are formed between the two hollow parts V which are adjacent to each other in the paper width direction in the lower surface 11*ny* (the adhesion surface which is to be adhered to the plate 11*o* depicted in FIG. 3 via the adhesive) of the plate 11*n* (see FIG. 4). In this case, as compared with such a case that only one groove is formed between the two hollow parts V, an area to which the adhesive is adhered or applied is small in an adhesive area between the two hollow parts V, thereby making it possible to suppress such a situation that the amount of the applied adhesive might become to be greater than a sufficient or necessary amount. Further, since the number of the groove is large, and thus it is possible to catch the adhesive in a greater amount. With this, it is possible to suppress any clogging of the hollow part V (individual channel 20) due to the adhesive, in a more ensured manner.

The adjacent groove 51 is not communicated with the atmosphere (see FIG. 4). There is such a case that any foreign matter is caught between the plate 11*n* and the plate 11*o* (see FIG. 3), and that the adjacent groove 51 and the hollow part V are communicated with each other via a gap around the foreign matter. In this case, if the adjacent groove 51 is communicated with the atmosphere, a part of the ink inside the hollow part V flows to the adjacent groove 51 due to any difference in the pressure between the adjacent groove 51 and the hollow part V, thereby lowering discharging pressure. In view of this point, in the present embodiment, since the adjacent groove 51 is not communicated with the atmosphere, it is unlikely that any difference in the pressure occurs between the adjacent groove 51 and the hollow part V even in a case that any foreign matter is caught between the plate 11*n* and the plate 11*o*, and that the adjacent groove 51 and the hollow part V are communicated with each other via the gap around the foreign matter. With this, it is possible to suppress the occurrence of such a problem that a part of the ink inside the hollow part V flows to the adjacent groove 51 and thereby lowers the discharging pressure.

The hollow part V constructs the outflow channel 25 which is the throttle channel part (see FIG. 4). Since the throttle channel part has a channel resistance which is great as compared with another channel part, the influence on the discharge is great in a case that the throttle channel part is clogged or blocked by the adhesive. In the present embodiment, the three grooves 51 and 52 are provided with respect to the outflow channel 25 which is the throttle channel part to suppress any clogging of the throttle channel part, thereby making it possible to effectively suppress any influence on the discharge.

The length L1 in the conveying direction of the adjacent groove 51 is not more than the length La in the conveying direction of the narrow width part Va (see FIG. 4). In this case, it is possible to suppress any interference between the adjacent groove 51 and the wide width parts Vb.

The length L2 in the conveying direction of the long length central groove 52*b* is longer than the length La in the conveying direction of the narrow width part Va (see FIG. 4). The linking groove 53, which extend in the paper width direction and which links the plurality of central grooves (long length central grooves 52*b*) arranged side by side in the paper width direction, are formed in the lower surface 11*ny* of the plate 11*n*. In this case, by communicating the linking groove 53 with the atmosphere, it is possible to communicate a plurality of pieces of the long length central groove 52*b* with the atmosphere.

The linking groove 53 links a plurality of pieces of the long length central groove 52*b* belonging to the two rows Vr which are adjacent to each other in the conveying direction (see FIG. 4). In this case, by communicating one piece of the linking groove 53 with the atmosphere, it is possible to communicate the plurality of pieces of the long length central groove 52*b* belonging to the two rows Vr.

Regarding each of the four rows Vr, a plurality of pieces of the hollow part V belonging to certain row Vr do not overlap, in the paper width direction (namely, as seen in the paper width direction), with a plurality of pieces of the hollow part V belonging to another row Vr which is adjacent to the certain row Vr in the conveying direction. In this case, it is possible to secure a space for forming the grooves 51 and 52 between the hollow parts V, with respect to each of the rows Vr.

In a case that any sedimentary component (such as a pigment, etc.) of the ink sediments and remains in the bottom part of the return channel 32 (see FIG. 3), there is such a possibility that the wide width part Vb (the part corresponding to the other end 25*x* of the outflow channel 25) of the hollow part V might be clogged. In view of this point, in the present embodiment, the connecting groove 54 connects or links two wide width parts Vb (the parts each of which corresponds to the other end 25*x* of the outflow channel 25) of two pieces of the hollow part V which are adjacent to each other in the paper width direction (see FIG. 4). With this, it is possible to promote a flow of the ink containing the sedimentary component and to dissolve the clogging. Also in this case, by making the connecting groove 54 formed in the upper surface 11*nx* of the plate 11*n* and the grooves 51 and 52 formed in the lower surface 11*ny* of the plate 11*n* not to overlap with each other, in the vertical direction (namely, as seen in the vertical direction), it is possible to suppress such a situation that the strength of the plate 11*n* is lowered locally (such a situation that a through hole is generated, etc.).

The grooves 51 and 52 have widths which are mutually same (see FIG. 4). In this case, it is possible to form the grooves 51 and 52 easily and with high precision.

Each of the grooves 51 and 52 has the width in the range of 30 μm to 70 μm. In a case that the width of each of the grooves 51 and 52 is less than 30 μm, the formation of the grooves 51 and 52 by the etching becomes difficult. In a case that the width of each of the grooves 51 and 52 exceeds 70 μm, it might be difficult to secure the rigidity of the plate 11*n*. In the present embodiment, by allowing each of the grooves 51 and 52 to have the width in the range of 30 μm to 70 μm, it is possible to suppress both of the above-described problems.

The spacing distance D1 between the hollow part V and the adjacent groove 51 which are adjacent to each other in the paper width direction and the spacing distance D2 between the adjacent groove 51 and the central groove 52 which are adjacent to each other in the paper width direction are each not less than 50 μm. In a case that the spacing distance(s) D1 and/or D2 are/is less than 50 μm, the adhesive area is too small, which in turn might cause any unsatisfactory adhesion. In the present embodiment, by making each of the spacing distances D1 and D2 to be not less than 50

μm, it is possible to secure the adhesive area and to suppress the occurrence of the unsatisfactory adhesion.

In a case that a large foreign body is caught between the plate 11*n* and the plate 11*o*, there is such a case that two hollow parts V which are adjacent to each other in the paper width direction are communicated with each other via a gap around the foreign matter. In a case that the two hollow parts V are communicated with each other, a desired discharge pressure cannot be obtained, which in turn might lead to any unsatisfactory discharge. The inventors of the present disclosure noticed that such a large foreign matter that communicate the two hollow parts V with each other is arranged straddling the central groove 52, and devised a configuration wherein any change in the pressure in the individual channel 20 is measured in a state that the central groove 52 (long length central groove 52*b*) is communicated with the atmosphere (step S3*a*: measuring step). Further, a determination as to whether or not the channel member 11 is unsatisfactory is performed (step S3*b*: determination step), based on the change in the pressure, For example, in a case that the pressure is lowered by an amount not less than the predetermined amount during a predetermined period of time, it is presumed that the hollow parts V are communicated with the central groove 52 (long length central groove 52*b*) (namely, it is presumed that a large foreign matter which communicates the two hollow parts V is caught between the plate 11*n* and the plate 11*o*). By determining as to whether or not the channel member 11 is unsatisfactory in such a manner, it is possible to prevent the unsatisfactory discharge in advance.

<Modifications>

In the foregoing, the embodiment of the present disclosure has been explained. The present disclosure, however, is not limited to or restricted by the above-described embodiment; a various kinds of design change can be made to the present disclosure within the range described in the claims.

In the above-described embodiment (FIG. 5), although the groove forming step (step S1*b*) and the channel forming step (step S1*a*) are performed at a time, the present disclosure is not limited to this. It is allowable that the groove forming step (step S1*b*) is performed before or after the channel forming step (step S1*a*).

In the above-described embodiment (FIG. 4), although the three grooves are formed between the two hollow parts V, the present disclosure is not limited to this. It is allowable that four or more grooves are formed between the two hollow parts V.

In the above-described embodiment (FIG. 4), although the direction in which the grooves 51 and 52 extend (third direction) and the direction in which the hollow parts V are arranged side by side (second direction) are orthogonal to each other, the present disclosure is not limited to this. It is allowable that the direction in which the grooves 51 and 52 extend (the third direction) crosses the second direction, and that, for example, the grooves 51 and 52 extend in an oblique direction with respect to the conveying direction in FIG. 4.

In the above-described embodiment (FIG. 3), although the plate 11*n* having the lower surface 11*ny* in which the connecting channel 23 and the outflow channel 25 are opened is an example of the “first plate” of the present invention, the present disclosure is not limited to this. It is allowable that any plate constructing the channel member 11 is the “first plate”. For example, it is allowable that the plate 11*b* having the lower surface in which the inflow channel 24 is opened is the “first plate”, and that three or more grooves are formed, in the lower surface of the plate 11*b*, in an area between two inflow channels 24 which are adjacent to each other in the paper width direction.

In the above-described embodiment (FIG. 2), although the two individual channel rows 20R are provided with respect to one common channel (return channel 32), the present disclosure is not limited to this. It is allowable, for example, that one individual channel row 20R is provided with respect to one common channel (return channel 32).

In the above-described embodiment (FIG. 2), although the individual channels are aligned to form the four rows, the present disclosure is not limited to this. It is allowable that the individual channels are aligned to form one to three row(s) or not less than five rows.

In the above-described embodiment, although the hollow part is constructed of both of the recessed part and through hole, the hollow part may be formed of one of the recessed part and the through hole.

The system of the liquid discharging head is not limited to the line system, and may be a serial system (in which the liquid is ejected or discharged from the nozzles to an object of discharge while the liquid discharging head is moving in a scanning direction parallel to the paper width direction).

The object of discharge is not limited to the paper sheet and may be, for example, cloth (fabric), a substrate, a plastic member, etc.

The liquid discharged from the nozzles is not limited to the ink, and may be any liquid (e.g., a treatment liquid that agglutinates or precipitates a component of an ink).

The present disclosure is applicable also to facsimiles, copy machines, multifunction peripherals, etc., without being limited to the printer. Further, the present disclosure is also applicable to a liquid discharge apparatus used for any other application than the image recording (for example, a liquid discharge apparatus which forms an electroconductive pattern by discharging an electroconductive liquid on a substrate).

What is claimed is:

1. A liquid discharging head comprising a channel member which includes a plurality of plates stacked in a first direction and adhered to each other via an adhesive, and in which a plurality of individual channels each including a nozzle and a pressure chamber communicated with the nozzle is formed, wherein the plurality of plates includes a first plate and a second plate adhered to an adhesion surface of the first plate via the adhesive;

a plurality of hollows each constructs one of the plurality of individual channels is opened in the adhesion surface; and the plurality of hollows is arranged side by side in a second direction orthogonal to the first direction in the adhesion surface, and three or more grooves are formed in the adhesion surface between two of the plurality of hollows adjacent to each other in the second direction, each of the three or more grooves extending in a third direction which is orthogonal to the first direction and which crosses the second direction.

2. The liquid discharging head according to claim 1, wherein an adjacent groove, of the three or more grooves, adjacent to one of the plurality of hollows in the second direction is not communicated with atmosphere.

3. The liquid discharging head according to claim 1, wherein each of the plurality of individual channels includes a plurality of channels connected to each other; and each of the plurality of hollows constructs a throttle channel which is one of the plurality of channels and which has a width narrower than a width of a channel, of the plurality of channels, connected to the throttle channel.

4. The liquid discharging head according to claim 3, wherein each of the plurality of hollows has a narrow part constructing the throttle channel part, and a wide part provided on an end in the third direction of the narrow part, a width of the wide part being greater than a width of the narrow part; and a length in the third direction of an adjacent groove, of the three or more grooves, adjacent to one of the plurality of hollows in the second direction is not more than a length in the third direction of the narrow part.

5. The liquid discharging head according to claim 4, wherein a length in the third direction of a central groove, of the three or more grooves, different from the adjacent groove adjacent to one of the plurality of hollows in the second direction is longer than the length in the third direction of the narrow part; and a linking grove which extends in the second direction and which links a plurality of pieces of the central groove arranged side by side in the second direction is formed in the adhesion surface.

6. The liquid discharging head according to claim 5, wherein the plurality of hollows is aligned in the second direction so as to form a plurality of rows arranged side by side in the third direction; and the linking groove links the plurality of pieces of the central groove belonging to two of the plurality of rows adjacent to each other in the third direction.

7. The liquid discharging head according to claim 1, wherein the plurality of hollows is aligned in the second direction so as to form a plurality of rows arranged side by side in the third direction; and hollows, of the plurality of hollows, belonging to a first row of the plurality of rows do not overlap in the second direction with hollows, of the plurality of hollows, belonging to a second row of the plurality of rows adjacent to the first row in the third direction.

8. The liquid discharging head according to claim 1, wherein a common channel communicated with the plurality of individual channels is formed in the channel member;

each of the plurality of hollows has a first end, and a second end connected to a bottom of the common channel;

a connecting groove extending in the second direction and connecting the second ends of two of the plurality of hollows adjacent to each other in the second direction is formed in a surface, of the first plate, on a side opposite to the adhesion surface; and none of the three or more grooves overlaps with the connecting groove in the first direction.

9. The liquid discharging head according to claim 1, wherein the three or more grooves have widths identical to each other.

10. The liquid discharging head according to claim 1, wherein each of the three or more grooves has a width in a range of 30 μm to 70 μm.

11. The liquid discharging head according to claim 1, wherein a spacing distance between one of the plurality of hollows and one of the three or more grooves adjacent to each other in the second direction is not less than 50 μm, and a spacing distance between two of the three or more grooves adjacent to each other in the second direction is not less than 50 μm.

12. A method of producing a liquid discharging head, the method comprising:

forming, in each of a plurality of plates including a first plate and a second plate, a plurality of hollows which constructs a plurality of individual channels each including a nozzle and a pressure chamber communicated with the nozzle;

forming a groove in an adhesion surface, of the first plate, to which the second plate is to be adhered via an adhesive, and in which the plurality of hollows is opened; and forming a channel member in which the plurality of individual channels is formed by stacking the plurality of plates in the first direction and adhering the plurality of plates to each other via the adhesive, after the forming of the plurality of hollows and the forming of the groove, wherein in the adhesion surface, the plurality of hollows is arranged side by side in a second direction orthogonal to the first direction; and the groove formed in the forming of the groove is three or more grooves between two of the plurality of hollows adjacent to each other in the second direction, each of the three or more grooves extending in a third direction which is orthogonal to the first direction and which crosses the second direction.

13. The method of producing the liquid discharging head according to claim 12, further comprising:

measuring a change in a pressure in the plurality of individual channels, after the forming of the channel member, by applying pressure to the plurality of individual channels, in a state that a central groove is communicated with atmosphere and the nozzle and the pressure chamber are sealed, the central groove being one of the three or more grooves and being different from an adjacent groove of the three or more grooves adjacent to one of the plurality of hollows in the second direction; and determining whether the channel member is unsatisfactory, based on the change in the pressure measured in the measuring of the change in the pressure in the plurality of individual channels.

14. A printing apparatus comprising;

the liquid discharging head as defined in claim 1, and a conveyer configured to convey a printing medium to which a liquid is to be discharged from the liquid discharging head.

* * * * *